US012583521B2

(12) United States Patent
Mikazuki et al.

(10) Patent No.: US 12,583,521 B2
(45) Date of Patent: Mar. 24, 2026

(54) AUTOMOBILE UNDERBODY STRUCTURE

(71) Applicant: NIPPON STEEL CORPORATION, Tokyo (JP)

(72) Inventors: Yutaka Mikazuki, Tokyo (JP); Yoshimitsu Yamazaki, Tokyo (JP); Yasunori Ito, Tokyo (JP); Atsushi Yamazaki, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 371 days.

(21) Appl. No.: 18/038,873

(22) PCT Filed: Dec. 1, 2021

(86) PCT No.: PCT/JP2021/044145
§ 371 (c)(1),
(2) Date: May 25, 2023

(87) PCT Pub. No.: WO2022/118897
PCT Pub. Date: Jun. 9, 2022

(65) Prior Publication Data
US 2024/0025480 A1 Jan. 25, 2024

(30) Foreign Application Priority Data
Dec. 1, 2020 (JP) ................................. 2020-199652

(51) Int. Cl.
*B62D 21/15* (2006.01)
*B60R 19/18* (2006.01)
*B62D 25/02* (2006.01)

(52) U.S. Cl.
CPC ............ *B62D 21/152* (2013.01); *B60R 19/18* (2013.01); *B62D 21/157* (2013.01); *B62D 25/025* (2013.01); *B60R 2019/1806* (2013.01)

(58) Field of Classification Search
CPC .. B62D 21/152; B62D 21/157; B62D 25/025; B60R 19/18
See application file for complete search history.

(56) References Cited

U.S. PATENT DOCUMENTS 4,221,413 A * 9/1980 Bonnetain ............... B60R 19/18
293/122
6,296,299 B1 * 10/2001 Hanakawa ............. B60J 5/0443
296/203.02

FOREIGN PATENT DOCUMENTS

| CN | 101835676 | * | 9/2010 |
| FR | 2859693 B1 | * | 2/2006 |
| JP | 2002-87321 A | | 3/2002 |

(Continued)

*Primary Examiner* — Joseph D. Pape
(74) *Attorney, Agent, or Firm* — Birch, Stewart, Kolasch & Birch, LLP

(57) ABSTRACT

An automobile underbody structure includes: a plurality of first frame parts; a second frame part; and an impact absorbing member, wherein: the second frame part has a first wall portion and a second wall; the impact absorbing member includes a first beam portion, a second beam portion, and a corrugated plate portion; the corrugated plate portion includes a first diagonal portion, a second diagonal portion, a first top portion, and a second top portion; and the corrugated plate portion is provided in at least respective regions, in the second frame part, to which the two adjacent first frame parts are connected.

4 Claims, 8 Drawing Sheets

(56)     References Cited

FOREIGN PATENT DOCUMENTS

| JP | 2006-335241 A | 12/2006 | |
| WO | WO-2019059821 A1 * | 3/2019 | ........... B62D 25/025 |

* cited by examiner

CRASH BOX

SIDE SILL

CROSS MEMBER
(FLOOR CROSS MEMBER)

SIDE MEMBER

BUMPER BEAM (a) COLLISION POSITION: CONNECTION POSITION OF CROSS MEMBER (b) COLLISION POSITION: BETWEEN CROSS MEMBERS

AUTOMOBILE UNDERBODY STRUCTURE

TECHNICAL FIELD

The present invention relates to an automobile underbody structure.

BACKGROUND ART

An automobile underbody structure constituted by structural members such as a side sill and a cross member requires energy absorption performance for absorbing an impact at collision time. As impact absorbing structures, Patent Document 1 discloses a structure in which a zigzag-shaped connecting member is attached between a vehicle-body side portion and a chassis. Patent Document 2 discloses a bumper stay provided with an X-shaped reinforcing rib in the interior of a hollow portion having a front wall, a rear wall, and curved side walls.

PRIOR ART DOCUMENT

Patent Document

Patent Document 1: Japanese Laid-open Patent Publication No. 2002-087321
Patent Document 2: Japanese Laid-open Patent Publication No. 2006-335241

SUMMARY OF THE INVENTION

Problems to be Solved by the Invention

A pole side impact test to evaluate the energy absorption performance by making a vehicle collide with a pole serves as an evaluation method of the energy absorption performance. In the pole side impact test, it is specified in advance which portion of the vehicle is made to collide with the pole. Thus, in the viewpoint of securing the energy absorption performance required as the automobile, the cross member is preferably disposed at a position brought into contact with the pole.

On the other hand, in an actually occurring side collision of the automobile, the collision sometimes occurs at a point not provided with the cross member such as a point between two adjacent cross members. In such a side collision, not only the energy absorption performance but also restraint on an entry amount of the structural member such as the side sill into a vehicle-interior side is required for the underbody structure. In particular, a body layout in which a battery is mounted under a floor is employed for an electric vehicle in recent years, and thus a reduction in the entry amount of the structural member into the vehicle-interior side at collision time also leads to a further improvement in a protective function of the battery. Further, the problem associated with such entry of the structural member into the vehicle-interior side as described above arises not only for the side collision between the cross members but also, for example, similarly, at the time of collision with a bumper beam between front member sides. Accordingly, without being limited to any collision direction, a deformation of the structural member into the vehicle-interior side at collision time can be preferably restrained.

However, the structure disclosed in Patent Document 1 is a structure in which the zigzag-shaped connecting member transmits a collision load to the side sill, and is not a structure in which a deformation itself of the side sill is restrained. The bumper stay in Patent Document 2 functions as a crash box, and does not have a structure in which a deformation of structural members into the vehicle-interior side at collision time is restrained.

The present invention has been made in consideration of the above circumstances, and has an object to reduce the entry amount of the structural member into the vehicle-interior side at collision time.

Means for Solving the Problems

An aspect of the present invention for solving the above problems is an automobile underbody structure, the automobile underbody structure includes: a plurality of spaced first frame parts; a second frame part having a hollow portion extending so that an axial direction of the first frame part is a normal direction when seen from a vehicle height direction; and an impact absorbing member disposed in the hollow portion of the second frame part, wherein: the second frame part has a first wall portion and a second wall portion facing the first wall portion; the first wall portion is connected to vehicle-exterior end faces of the first frame parts in the axial direction; the impact absorbing member includes: a first beam portion extending along an axial direction of the second frame part; a second beam portion facing the first beam portion; and a corrugated plate portion connected to the first beam portion and the second beam portion between the first beam portion and the second beam portion, wherein: the first beam portion is connected to the first wall portion of the second frame part; the second beam portion is connected to the second wall portion of the second frame part; the corrugated plate portion includes: a first diagonal portion extending in a direction from the second beam portion toward the first beam portion; a second diagonal portion extending in a direction from the first beam portion toward the second beam portion; a first top portion which is a connection portion of the first diagonal portion and the second diagonal portion on the first beam portion side; and a second top portion which is a connection portion of the first diagonal portion and the second diagonal portion on the second beam portion side; and the corrugated plate portion is provided in at least respective regions, in the second frame part, to which the two adjacent first frame parts are connected.

Effect of the Invention

According to the present invention, it is possible to reduce an entry amount of a structural member into a vehicle-interior side at collision time.

EMBODIMENTS FOR CARRYING OUT INVENTION

Figure 1:
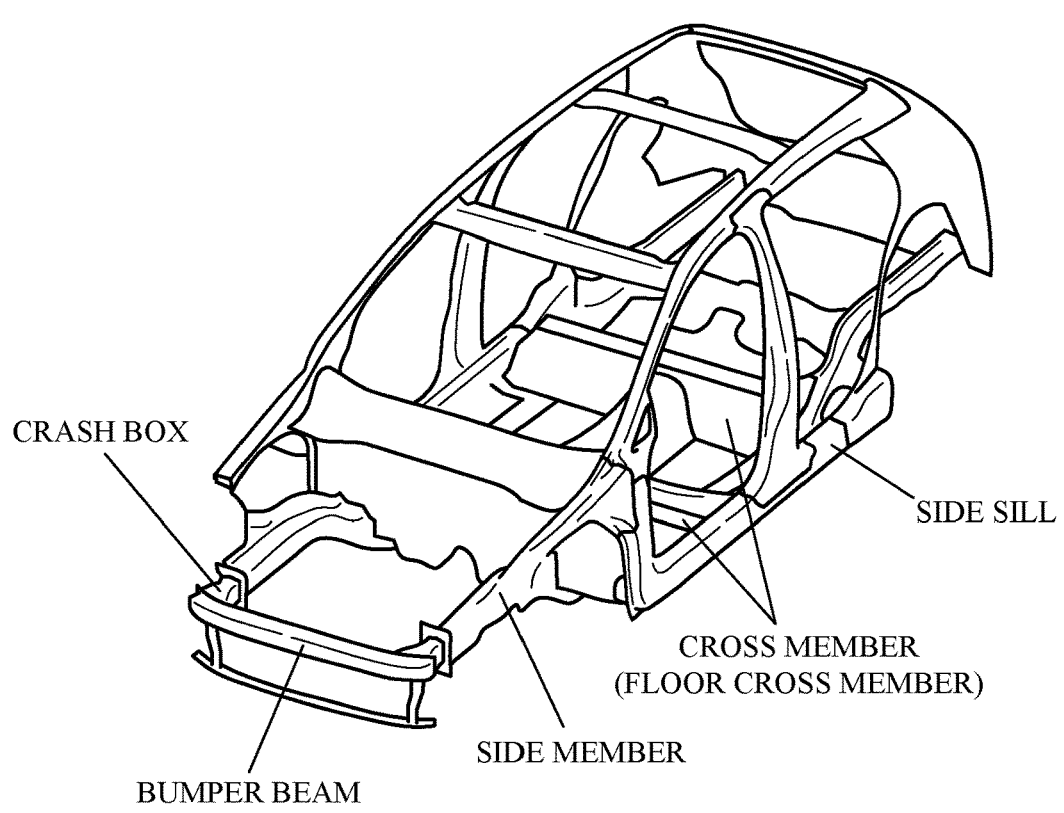
FIG. 1 is a view illustrating one example of a body framework of an automobile.

Hereinafter, an embodiment of the present invention will be described while referring to the drawings. Note that in the present description and the drawings, elements having substantially the same functional configurations are denoted by the same codes to omit overlapped explanation.

FIG. 1 is a view illustrating one example of a body framework of an automobile. The body framework of the automobile includes, for example, a cross member (floor cross member) extending in a vehicle width direction, a side sill extending in a vehicle length direction, a bumper beam extending in the vehicle width direction, a side member extending in the vehicle length direction, and the like as illustrated in FIG. 1.

First Embodiment

Figure 2:
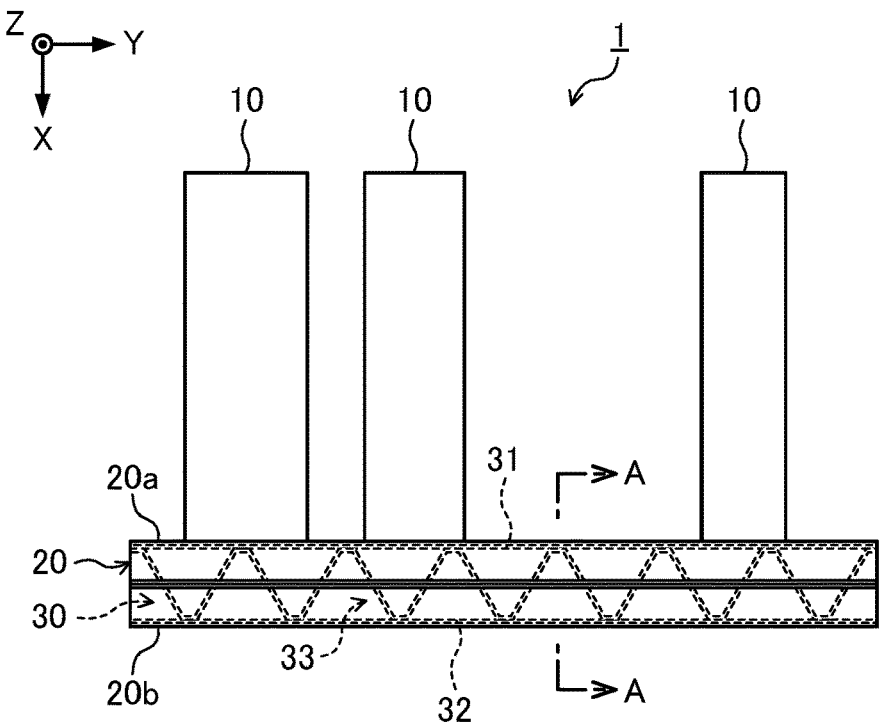
FIG. 2 is a view illustrating a schematic configuration of an automobile underbody structure according to a first embodiment of the present invention.

FIG. 2 is a view illustrating a schematic configuration of an underbody structure 1 according to the first embodiment. The underbody structure 1 of this embodiment includes a plurality of first frame parts 10 extending in an X direction and a second frame part 20 extending in a Y direction. Note that FIG. 2 is a view of the underbody structure 1 being seen from a vehicle height direction (Z direction), and thus the "second frame part 20 extending in the Y direction" can also be reworded as the second frame part 20 extending so that an axial direction (extending direction) of the first frame part 10 is a normal direction when seen from the vehicle height direction.

The respective first frame parts 10 are spaced along an axial direction of the second frame part 20 (Y direction). Further, the second frame part 20 is connected to vehicle-exterior end faces of the first frame parts 10. The first frame parts 10 and the second frame part 20 may be directly connected to one another, or may be indirectly connected by providing some member between the first frame parts 10 and the second frame part 20.

The first frame part 10 is a structural member such as, for example, a cross member and a side member, and a member which exhibits energy absorption performance or impact resistance performance when a collision load is input from the axial direction. When the first frame parts 10 are the cross members, the second frame part 20 is the side sill. The side sill extends so that the axial direction of the cross member (X direction) is the normal direction, and is connected to the vehicle-exterior end faces of the cross members. Thus, when the first frame parts 10 are the cross members, and the second frame part 20 is the side sill, the X direction in the present description and the drawings is the vehicle width direction, and the Y direction therein is the vehicle length direction.

On the other hand, when the first frame parts 10 are the side members, the second frame part 20 is the bumper beam. The bumper beam extends so that the axial direction of the side member (X direction) is the normal direction, and is connected to the vehicle-exterior end faces of the side members with crash boxes therebetween. Thus, the first frame parts 10 are the side members, and the second frame part 20 is the bumper beam, the X direction in the present description and the drawings is the vehicle length direction, and the Y direction therein is the vehicle width direction. Note that the side member may be a front side member or may be a rear side member. Further, the bumper beam may be a front bumper beam or may be a rear bumper beam. For example, when the first frame parts 10 are the front side members, the second frame part 20 is the front bumper beam, and when the first frame parts 10 are the rear side members, the second frame part 20 is the rear bumper beam.

A shape and a material of the first frame part 10 is not particularly limited as long as they are suitable as the structural member of the underbody structure 1 of automobiles. For example, the first frame part 10, whose cross section perpendicular to the axial direction (X direction) is in a closed cross-sectional shape, is in a shape having a square tube-shaped hollow portion. Further, for example, as the material of the first frame part 10, a metallic material such as a steel sheet having, for example, a tensile strength of 590 MPa or more, a metallic material such as an aluminum alloy member or a magnesium alloy member, or the like can be employed. A length of the first frame part 10 in the axial direction is, for example, 500 to 1500 mm, and a plate thickness of the first frame part 10 is, for example, 1 to 5 mm. When the cross section perpendicular to the axial direction of the first frame part 10 is in a square tube shape, a section size of the first frame part 10 is, for example, 30 to 200 mm square.

Figure 3:
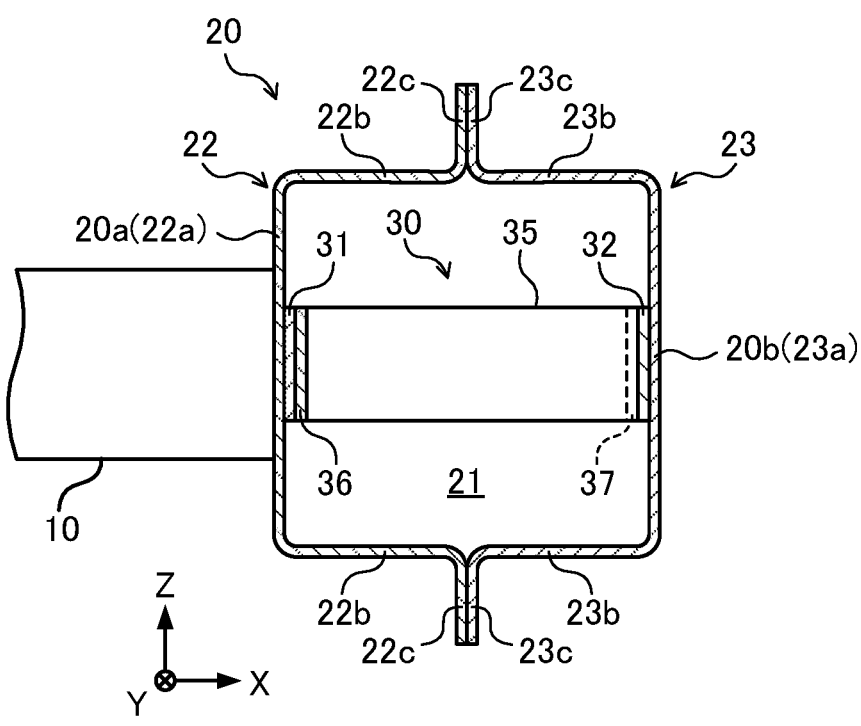
FIG. 3 is a view illustrating a cross section taken along A-A in FIG. 2.
Figure 4:
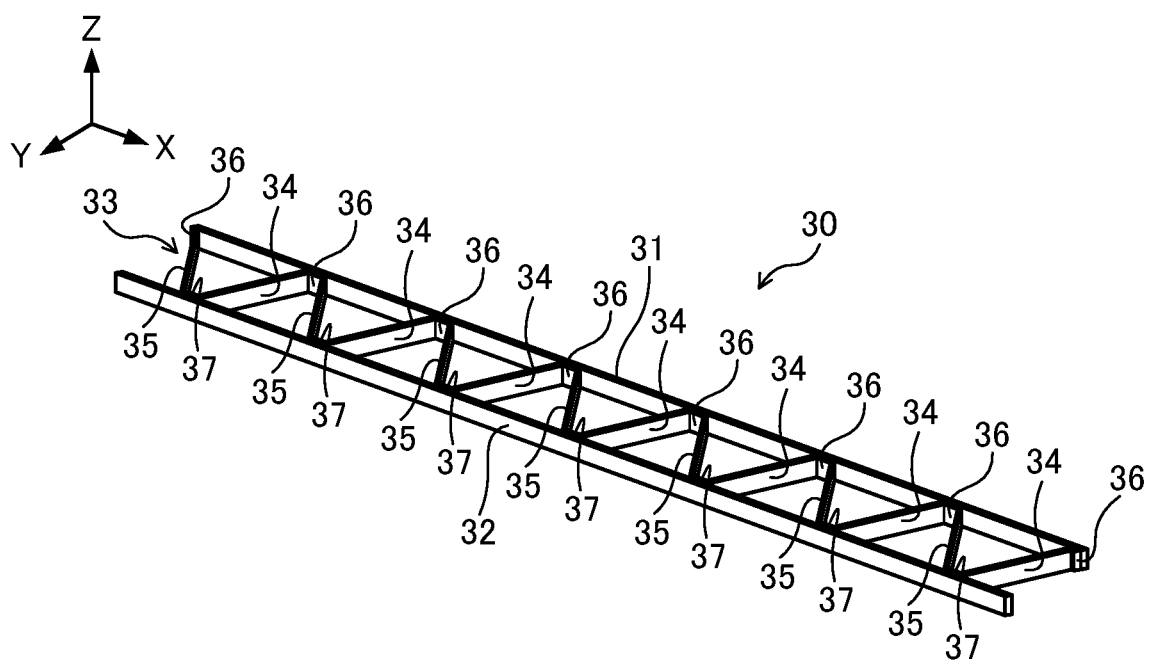
FIG. 4 is a perspective view illustrating an impact absorbing member of the first embodiment.
Figure 5:
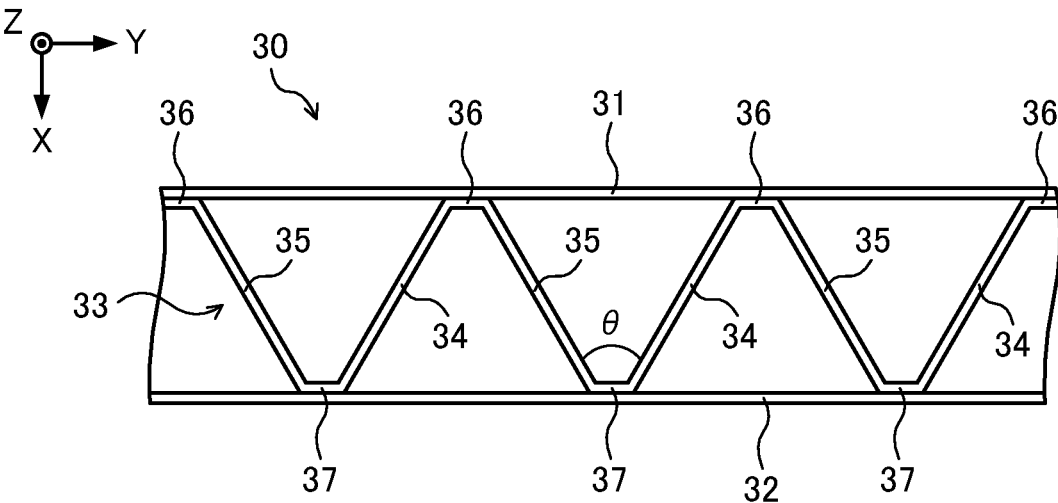
FIG. 5 is an enlarged view of the impact absorbing member seen from a vehicle height direction.

FIG. 3 is a view illustrating a cross section taken along A-A in FIG. 2, and indicates a cross section perpendicular to the axial direction of the second frame part 20 (Y direction). The second frame part 20 has a hollow portion 21 extending in the axial direction (Y direction). The hollow portion 21 of this embodiment is formed by joining two members such as an inner member 22 and an outer member 23 to each other as illustrated in FIG. 3. For this embodiment, the inner member 22 is a hat-shaped member including a top plate 22*a*, a vertical wall 22*b*, and a flange 22*c*, and the outer member 23 is a hat-shaped member including a top plate 23*a*, a vertical wall 23*b*, and a flange 23*c*.

Note that the hollow portion 21 of this embodiment is formed of the two hat-shaped members, and for example, either member of the two hat-shaped members may be a flat plate. Further, the hollow portion 21 need not be limited to one formed by connecting a plurality of members, but may be formed by, for example, extrusion molding. Further, a shape of the hollow portion 21 on a cut surface perpendicular to the axial direction of the second frame part 20 is not limited to a square tube shape.

As a material of the second frame part 20, the metallic material such as the steel sheet having, for example, the tensile strength of 590 MPa or more, the metallic material such as the aluminum alloy member or the magnesium alloy member, or the like can be employed. A length of the second frame part 20 in the axial direction (Y direction) is, for example, 1000 to 3000 mm, and a plate thickness of the second frame part 20 is, for example, 1 to 5 mm. When the cross section perpendicular to the axial direction of the second frame part 20 is in a square tube shape, a section size of the second frame part 20 is, for example, 50 to 200 mm square.

The second frame part 20 includes a first wall portion 20*a* and a second wall portion 20*b*. The first wall portion 20*a* and the second wall portion 20*b* face each other, and the first wall portion 20*a* is connected to the vehicle-exterior end faces of the first frame parts 10 in the axial direction (X direction). For this embodiment, the first wall portion 20*a* corresponds to the top plate 22*a* of the inner member 22, and the second wall portion 20*b* corresponds to the top plate 23*a* of the outer member 23.

The underbody structure 1 includes an impact absorbing member 30 in the hollow portion 21 of the second frame part 20 as illustrated in FIG. 2 to FIG. 5. The impact absorbing member 30 includes a first beam portion 31, a second beam portion 32, and a corrugated plate portion 33.

The first beam portion 31 and the second beam portion 32 face each other, and the first beam portion 31 and the second beam portion 32 each extend along the axial direction of the second frame part 20 (Y direction). A length of each of the first beam portion 31 and the second beam portion 32 in the extending direction (Y direction) is at least longer than a distance between the two adjacent first frame parts 10, and the first beam portion 31 and the second beam portion 32 each have a length extending across the two adjacent first frame parts 10. The first beam portion 31 of this embodiment is formed in a plate shape, and connected to the first wall portion 20*a* of the second frame part 20. Further, the second beam portion 32 of this embodiment is formed in a plate shape, and connected to the second wall portion 20*b* of the second frame part 20.

The corrugated plate portion 33 is connected to the first beam portion 31 and the second beam portion 32 so as to extend across between the first beam portion 31 and the second beam portion 32. The corrugated plate portion 33 of this embodiment continuously extends along the axial direction of the second frame part 20 (Y direction). The corrugated plate portion 33 has a first diagonal portion 34, a second diagonal portion 35, a first top portion 36, and a second top portion 37. The first diagonal portion 34 extends in a direction from the second beam portion 32 toward the first beam portion 31, and the second diagonal portion 35 extends in a direction from the first beam portion 31 toward the second beam portion 32. The first top portion 36 and the second top portion 37 are each a portion to which the first diagonal portion 34 and the second diagonal portion 35 are connected, and the first top portion 36 is a connection portion on the first beam portion 31 side, and the second top portion 37 is a connection portion on the second beam portion 32 side.

The first top portion 36 and the second top portion 37 of this embodiment are each formed in a flat-plate shape, the first top portion 36 is connected to the first beam portion 31, and the second top portion 37 is connected to the second beam portion 32. In this embodiment, each of the first top portion 36 and the second top portion 37 is present in plurality, and the first top portions 36 and the second top portions 37 are alternately positioned in the axial direction of the second frame part 20. Note that from the viewpoint of effectively reducing an entry amount of the second frame part 20 into the vehicle-interior side at collision time, all the first top portions 36 are preferably connected to the first beam portion 31, but as long as the position of the corrugated plate portion 33 with respect to the first beam portion 31 can be fixed, not all the first top portions 36 need to be connected to the first beam portion 31. For example, some of the first top portions 36 are only required to be simply in contact with the first beam portion 31 or be in close proximity to the first beam portion 31 without being connected thereto. For the same reason, not all the second top portions 37 need to be connected to the second beam portion 32.

An angle θ made by the first diagonal portion 34 and the second diagonal portion 35 (FIG. 5) is set optionally, and from the viewpoint of effectively restraining the entry amount of the second frame part 20 into the vehicle-interior side as presented in later-described examples, the angle θ when the corrugated plate portion 33 is provided in a region, in the second frame part 20, to which the first frame part 10 is connected is preferably 70 degrees or less. The angle is more preferably 60 degrees or less. Further, the angle θ when the corrugated plate portion 33 is provided between the adjacent first frame parts 10 is preferably 40 to 80 degrees. The angle θ in this case is preferably 50 degrees or more, and preferably 70 degrees or less.

As a material of the first beam portion 31, the second beam portion 32, and the corrugated plate portion 33, the metallic material such as the steel sheet having, for example, the tensile strength of 590 MPa or more, the metallic material such as the aluminum alloy member or the magnesium alloy member, or the like can be employed. Further, a plate thickness of each of the first beam portion 31, the second beam portion 32, and the corrugated plate portion 33 is, for example, 1 to 10 mm.

Note that a connecting means of the first beam portion 31 of the impact absorbing member 30 and the first wall portion 20*a* of the second frame part 20, a connecting means of the second beam portion 32 of the impact absorbing member 30 and the second wall portion 20*b* of the second frame part 20, a connecting means of the corrugated plate portion 33 of the impact absorbing member 30 and the first beam portion 31, a connecting means of the corrugated plate portion 33 and the second beam portion 32, and the like are not particularly limited. For example, a mechanical joining means such as riveting, or a joining means such as arc welding or spot welding can be employed. Further, a shape of the first top portion 36 and the second top portion 37 is not limited to the flat-plate shape as in this embodiment, but appropriately changed depending on the employed connecting means.

In the impact absorbing member 30 of this embodiment, the first beam portion 31, the second beam portion 32, and the corrugated plate portion 33 are formed of respective separate members, but may be integrally molded by, for example, extrusion molding. Note that vehicle-height-direction lengths of the first beam portion 31, the second beam portion 32, and the corrugated plate portion 33 are each appropriately changed depending on required energy absorption performance or a weight limit.

Figure 6:
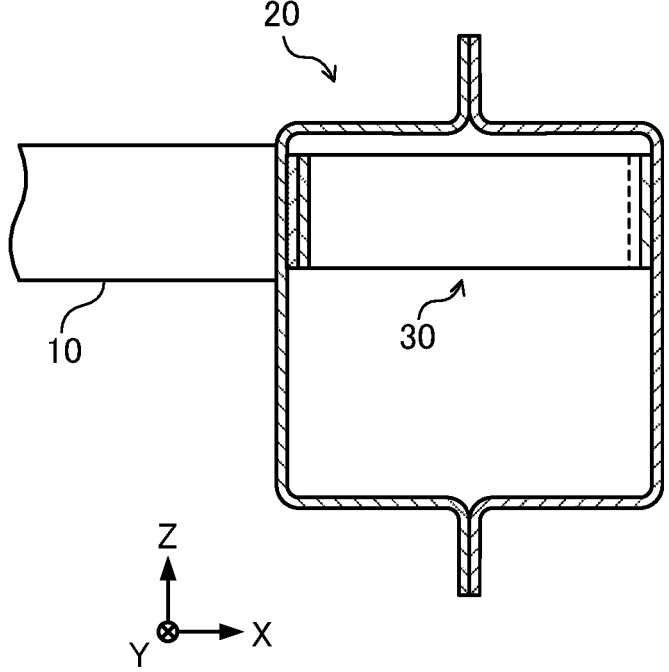
FIG. 6 is a view illustrating a disposition example of the impact absorbing member.

Further, a connection position of the impact absorbing member 30 in the vehicle height direction (Z direction) with respect to the second frame part 20 (a height at which the impact absorbing member 30 is disposed) is preferably positioned in a region, in the second frame part 20, in which the first frame parts 10 are connected. In FIG. 3 for example, the impact absorbing member 30 is disposed in a middle portion in the vehicle height direction of the second frame part 20, and when the first frame part 10 is disposed in the vicinity of an upper end portion of the second frame part 20 as in FIG. 6, the impact absorbing member 30 is preferably also disposed in the vicinity of the upper end portion of the second frame part 20.

The underbody structure 1 of this embodiment is constituted as described above. In the underbody structure 1 as in this embodiment, when a collision load from the X direction is input to a region, of the second frame part 20, between the two adjacent first frame parts 10, the collision load can be easily distributed to a region other than a collision point by providing the impact absorbing member 30.

In a detailed description, in the impact absorbing member 30, providing the second beam portion 32 extending in the Y direction causes the collision load input from the X direction to the second frame part 20 to also spread in the Y direction in the course of a deformation of the second beam portion 32 and to be also transmitted to the first diagonal portions 34 and the second diagonal portions 35 in the region other than the collision point. Further, disposing the first diagonal portions 34 and the second diagonal portions 35 to be inclined in a manner to form an angle with each other causes the collision load transmitted to the first diagonal portions 34 and the second diagonal portions 35 to further spread in the Y direction. Further, the collision load transmitted from the first diagonal portions 34 or the second diagonal portions 35 to the first beam portion 31 further spreads in the Y direction in the course of a deformation of the first beam portion 31 similarly to the second beam portion 32.

According to the impact absorbing member 30 included in the underbody structure 1 of this embodiment, such a distribution of the collision load as described above at collision time also uses material portions in the region other than the collision point, which enables withstanding of the collision load. As a result, the entry amount of the second frame part 20 into the vehicle-interior side at collision time can be reduced.

Second Embodiment

Figure 7:
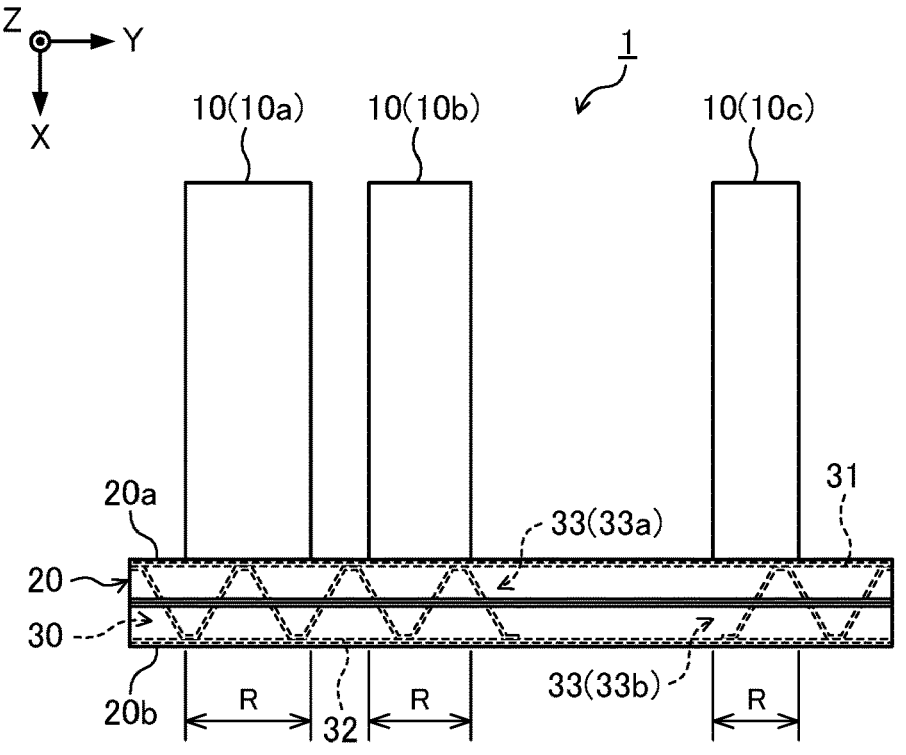
FIG. 7 is a view illustrating a schematic configuration of an automobile underbody structure according to a second embodiment of the present invention.
Figure 8:
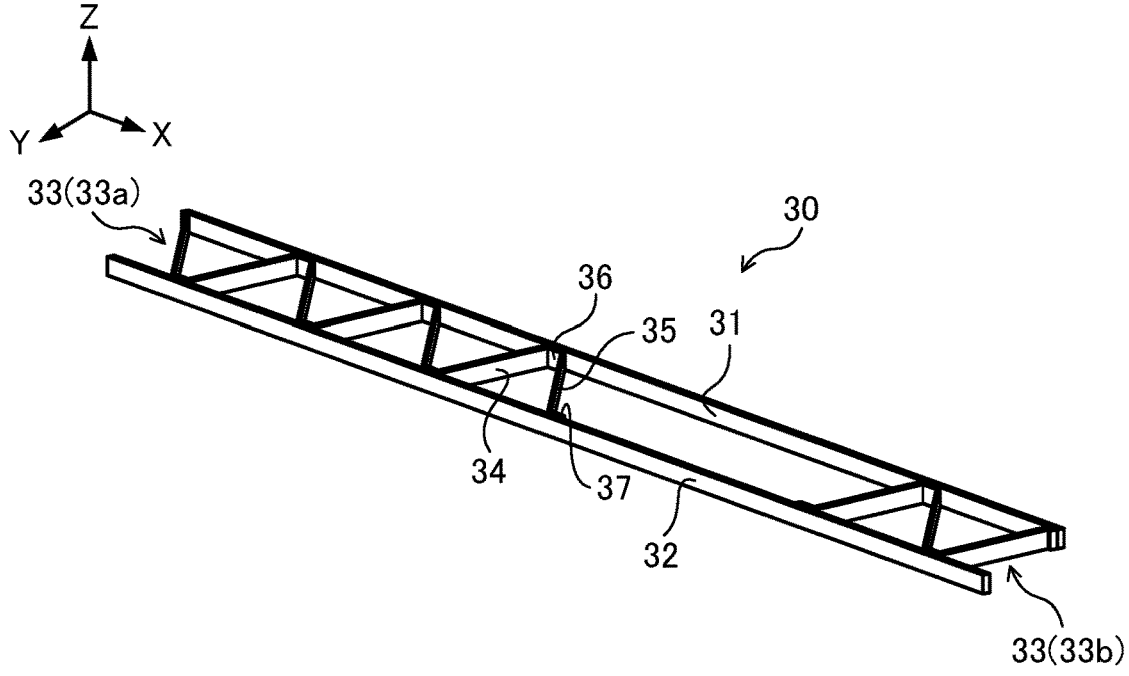
FIG. 8 is a perspective view illustrating an impact absorbing member of the second embodiment.

FIG. 7 is a view illustrating a schematic configuration of an underbody structure 1 according to a second embodiment, and FIG. 8 is a perspective view of an impact absorbing member 30 of the second embodiment. In the impact absorbing member 30 of this embodiment, a region in which a corrugated plate portion 33 is not provided in an extending direction of the impact absorbing member 30 (Y direction) is present.

In other words, the impact absorbing member 30 includes a plurality of corrugated plate portions 33a, 33b, and the respective corrugated plate portions 33a, 33b are spaced along the extending direction of the impact absorbing member 30. The respective corrugated plate portions 33a, 33b are provided in regions R, in a second frame part 20, to which first frame parts 10 are connected, and the region in which the corrugated plate portion 33 is not provided is positioned between the two adjacent first frame part 10b and first frame part 10c.

In the underbody structure 1 as in this embodiment, when a collision load is input to the region, of the second frame part 20, between the two adjacent first frame parts 10b, 10c, the collision load is transmitted to the two adjacent corrugated plate portions 33 connected by the second beam portion 32, to allow the corrugated plate portions 33a, 33b to bear the collision load. On the other hand, in the region in which the corrugated plate portion 33 is not provided, due to the absence of a first diagonal portion 34 and a second diagonal portion 35, the second beam portion 32 is easily deformed into a vehicle-interior side as compared with a case of the first embodiment.

In the region in which the corrugated plate portion 33 is not provided, the absence of the first diagonal portion 34 and the second diagonal portion 35 which transmit the collision load from the second beam portion 32 to the first beam portion 31 makes it difficult that a deformation of the first beam portion 31 into the vehicle-interior side appears until the second beam portion 32 comes into contact with the first beam portion 31. Further, the collision load is not transmitted to the first diagonal portion 34 and the second diagonal portion 35 in this region, corresponding to which, the collision load spreads in a larger region of the impact absorbing member 30 in the Y direction.

Thus, the larger region of the impact absorbing member 30 in the Y direction can bear the collision load as compared with the case of the first embodiment. Further, the two adjacent corrugated plate portions 33a, 33b connected by the first beam portion 31 and the second beam portion 32 makes it possible to withstand the collision load. This allows the second beam portion 32 to sufficiently absorb impact until the second beam portion 32 comes into contact with the first beam portion 31, resulting in enabling a reduction in entry amount of the second frame part 20 into the vehicle-interior side even though the region in which the corrugated plate portion 33 is not provided is present in the impact absorbing member 30.

To effectively reduce the entry amount of the second frame part 20 into the vehicle-interior side as described above, a first top portion 36 of the corrugated plate portion 33 is preferably not positioned in a region, in the second frame part 20, between the two first frame parts 10 adjacent in the axial direction (Y direction). The reason is as follows.

When the collision load is input to a second wall portion 20b of the second frame part 20, the collision load spreads to the first top portion 36, which causes the first wall portion 20a to be easily deformed in the vehicle-interior side at a point where the first top portion 36 is present. When the corrugated plate portion 33 is provided continuously in the axial direction of the second frame part 20 as in the previously described first embodiment, the respective first top portions 36 are connected to one another with the first diagonal portions 34 and the second diagonal portions 35 therebetween, which easily distributes the collision load to the respective first top portions 36. This enables restraint on the deformation of the first wall portion 20a even at the points where the first top portions 36 are present.

On the other hand, in the case where the corrugated plate portion 33 is not provided continuously in the axial direction of the second frame part 20, for example, when the first top portion 36 is positioned in the region between the two first frame parts 10, the collision load is easily concentrated on the first top portion 36 closest to a collision point, which easily deforms the first wall portion 20a into the vehicle-interior side at this point. In contrast to this, as long as the corrugated plate portions 33 are disposed so as not to position the first top portion 36 between the two first frame parts 10 as in the second embodiment, the deformation of the first wall portion 20a into the vehicle-interior side at the points where the first top portions 36 are present is restrained by the first frame parts 10. This also enables restraint on a deformation as the entire first wall portion 20a into the vehicle-interior side.

Note that in this embodiment, the region in which the corrugated plate portion 33 is not provided is positioned between the first frame part 10b and the first frame part 10c illustrated in FIG. 7, and may be positioned between the first frame part 10a and the first frame part 10b, or may be positioned in each of all intervals from the first frame part 10*a* to the first frame part 10*c*. In any case, the first top portion 36 of the corrugated plate portion 33 is preferably not positioned in the region between the two adjacent first frame parts 10.

Figure 9:
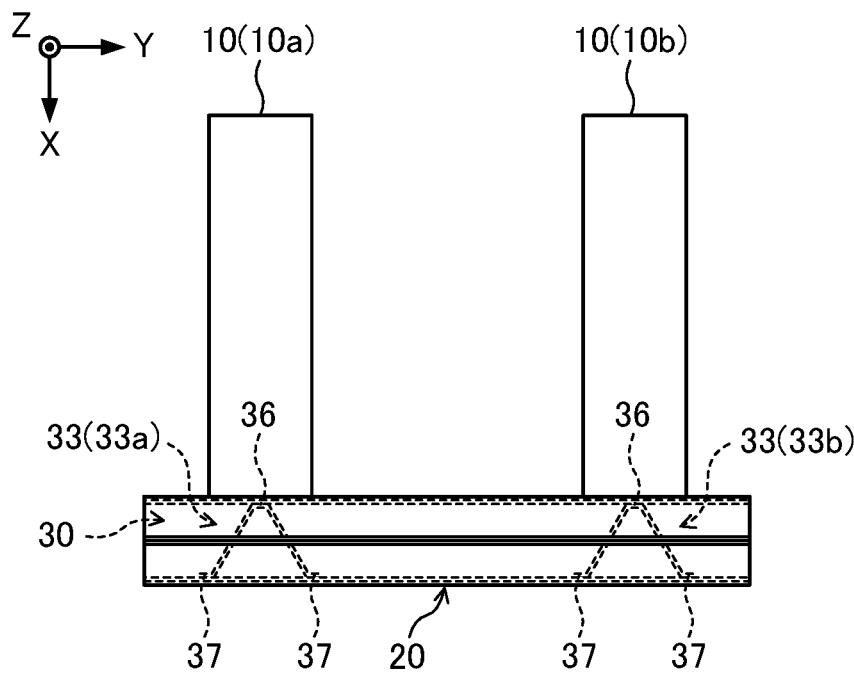
FIG. 9 is a view illustrating a shape example of a corrugated plate portion.

Further, the corrugated plate portion 33 of the impact absorbing member 30 can reduce the entry amount of the second frame part 20 into the vehicle-interior side even though it is not provided between the two adjacent first frame parts 10 as described in this embodiment. Thus, the corrugated plate portions 33 only need to be provided in at least the regions R, in the second frame part 20, to which the two adjacent first frame parts 10 are connected. For example, the corrugated plate portions 33 may be provided as in FIG. 9. In an example in FIG. 9, the one corrugated plate portion 33 is provided with one each of the first diagonal portion 34 and the second diagonal portion 35, and the first top portion 36 and second top portions 37 are at three points in total.

Figure 10:
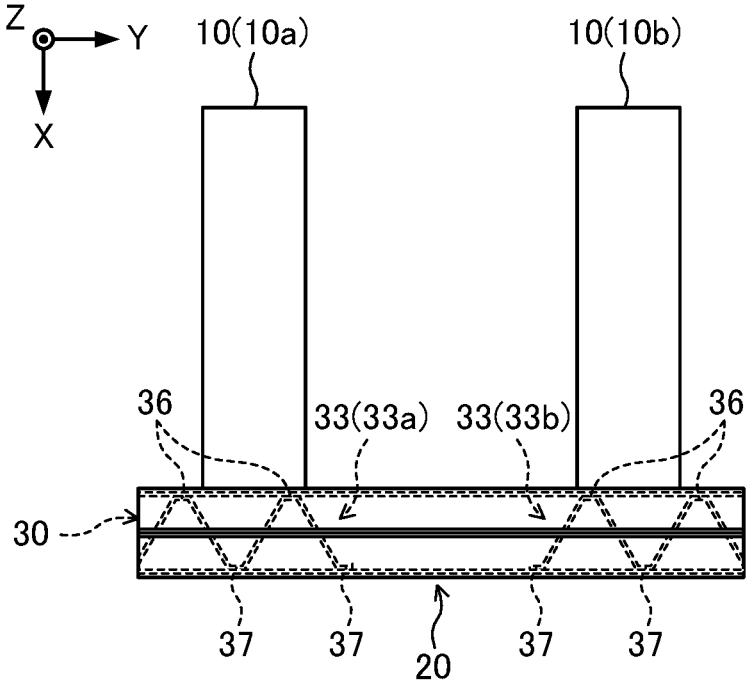
FIG. 10 is a view illustrating a shape example of a corrugated plate portion.

Further, for example, the corrugated plate portions 33 may be provided as in FIG. 10. In an example in FIG. 10, the one corrugated plate portion 33 is provided with two each of the first diagonal portion 34 and the second diagonal portion 35, and the first top portions 36 and the second top portions 37 are at five points in total. In the viewpoint of effectively improving energy absorption performance, it is preferable that each of the corrugated plate portions 33 is provided with the plurality of first diagonal portions 34 and second diagonal portions 35, and has the first top portions 36 and the second top portions 37 at five points or more in total as in FIG. 10.

Although one example of an embodiment of the present invention has been described above, the present invention is not limited to such an example. It should be understood that various changes or modifications are readily apparent to those skilled in the art within the scope of the technical spirit as set forth in claims, and those should also be covered by the technical scope of the present invention as a matter of course.

In the above-described embodiment, for example, only one row of the corrugated plate portions 33 of the impact

EXAMPLES

<Simulation (1)>

Figure 11:
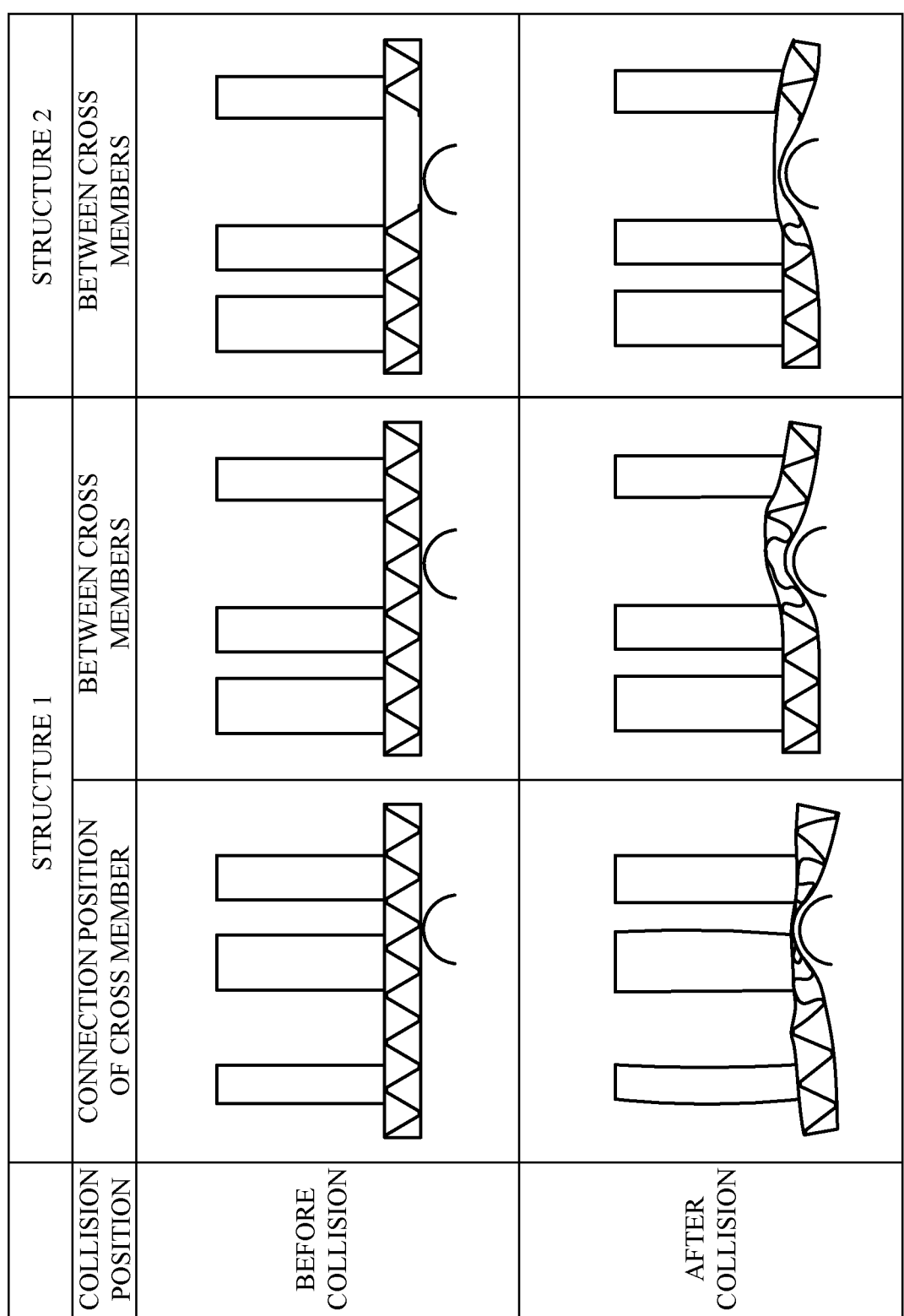
FIG. 11 is diagrams illustrating analysis models of a pole side impact simulation (1), and deformed states of side sills after the simulation.

A pole side impact simulation was carried out by using analysis models of underbody structures of a structure 1 and a structure 2 illustrated in FIG. 11. First frame parts are cross members, and a second frame part is a side sill in this examples. The structure 1 is the model in which a corrugated plate portion is provided across the entire region of an impact absorbing member in an extending direction. The structure 2 is the model in which the corrugated plate portion is not provided between the cross members. Further, the structure 2 is the same model as the structure 1 except that regions in which the corrugated plate portions are provided are different.

In this simulation, a pole was entered into a vehicle-exterior wall portion of the side sill at a constant speed, and a deformed state and an entry amount of the vehicle-interior wall portion of the side sill in each of the structures at this time were evaluated. In the simulation for the structure 1, the simulation in a case of making the pole collide at each position of a position to which the cross member is connected and a position between the cross members is carried out. In the simulation for the structure 2, the simulation in a case of making the pole collide at a position between the cross members is carried out.

This simulation is carried out by using a plurality of models in which plate thicknesses of a beam portion (a first beam portion and a second beam portion) and plate thicknesses of the corrugated plate portion are varied. Conditions such as a material, the plate thicknesses, and the like of the impact absorbing member are as in the following Table 1. An angle θ made by a first diagonal portion and a second diagonal portion (FIG. 5) is set to 60 degrees in this simulation. Note that a material of the cross member and the side sill is presumed to be a steel sheet having a tensile strength of 980 MPa grade similarly to the impact absorbing member. Table 1 also presents the entry amounts of the vehicle-interior wall portion of the side sill (deformation amounts at a point having the largest deformation into the vehicle-interior side) as simulation results.

TABLE 1

| | | | Impact absorbing member | | | | Entry amount of vehicle-interior wall portion of side sill (mm) | |
| | | | Plate thickness | Corrugated plate portion | | Weight | | |
| | Material | Tensile strength (MPa) | of beam portion (mm) | Plate thickness (mm) | Angle θ | (ratio with respect to structure 1) | Collision position: connection position of cross member | Collision position: between cross members |
|---|---|---|---|---|---|---|---|---|
| Structure 1 | Steel sheet | 980 | 7.6 | 5.2 | 60 degrees | — | 40 | 56 |
| | | | 7.0 | 5.8 | | | 34 | 56 |
| | | | 6.4 | 6.4 | | | 29 | 57 |
| | | | 5.8 | 7.0 | | | 28 | 60 |
| | | | 5.2 | 7.6 | | | 27 | 61 |
| Structure 2 | Steel sheet | 980 | 7.6 | 5.2 | 60 degrees | 88.70% | — | 46 |
| | | | 7.0 | 5.8 | | 87.20% | — | 43 |
| | | | 6.4 | 6.4 | | 85.60% | — | 42 |
| | | | 5.8 | 7.0 | | 84.10% | — | 41 |
| | | | 5.2 | 7.6 | | 82.60% | — | 44 | absorbing member 30 extending in the axial direction of the second frame part 20 (Y direction) is provided, and a plurality of rows of the impact absorbing members 30 extending in the Y direction may be disposed in parallel side by side along the axial direction of the first frame part 10 (X direction).

As indicated by the results in Table 1, the models of the structure 2 not provided with the corrugated plate portion between the cross members were more reduced in the entry amount of the side sill into the vehicle-interior side than those of the structure 1 provided with the corrugated plate portion across the entire region of the impact absorbing member in the extending direction. A glance at the deformed states of the structure 1 and the structure 2 illustrated in FIG. 11 also shows that the structure 2 has a larger deformed region of the side sill in the axial direction. Further, in this simulation, a weight of each of the models of the structure 2 is reduced by about 10 to 20% with respect to each of the models of the structure 1. Accordingly, as indicated by the results of this simulation, the structure not provided with the corrugated plate portion between the cross members enables the reduction in the entry amount of the side sill into the vehicle-interior side, and also enables a reduction in weight of the impact absorbing member.

<Simulation (2)>

Figure 12:
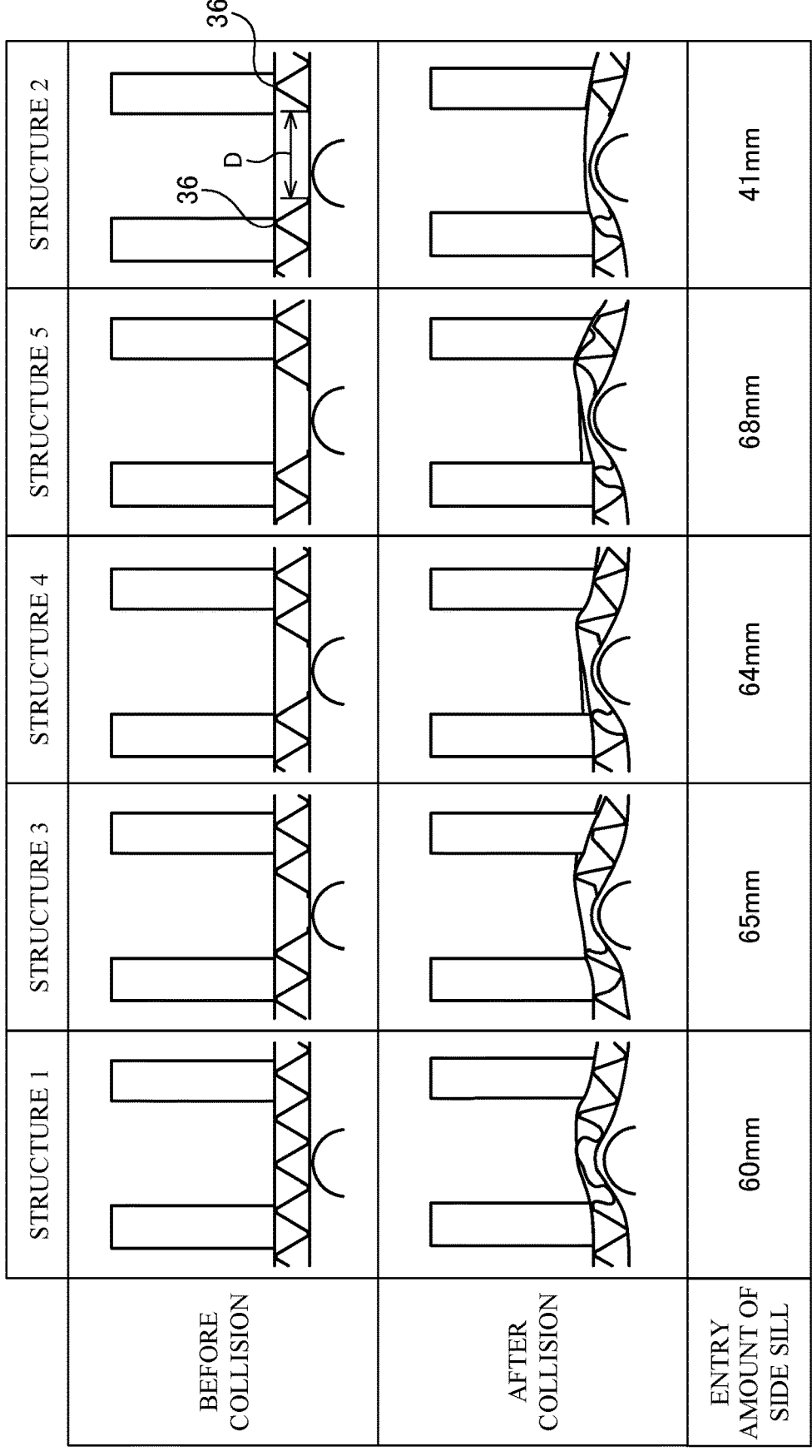
FIG. 12 is diagrams illustrating analysis models of a pole side impact simulation (2), and deformed states of side sills after the simulation.

As illustrated in FIG. 12, a pole side impact simulation was carried out with structures 3 to 5 in which distances D between the corrugated plate portions of the structure 2 in the simulation (1) were varied. Note that the structure 1 and the structure 2 illustrated in FIG. 12 are the same structures as the simulation (1). The structure 3 has the narrowest distance D, and the distance D is gradually increased in order of the structure 3, the structure 4, the structure 5, and the structure 2. Of the structures 2 to 5, the structure 2 is the model in which the first top portion 36 of the corrugated plate portion is not positioned between the two adjacent cross members, and the structures 3 to 5 are each a model in which the first top portion 36 of at least one corrugated plate portion of the two corrugated plate portions is positioned between the two cross members. The simulation is carried out on the structures 1 to 5 under the same conditions except that the distances D between the corrugated plate portions are different.

In focusing attention on deformed states after collision in the structure 3 to the structure 5 illustrated in FIG. 12, deformation amounts at points at each of which the first top portion 36 of the corrugated plate portion is positioned between the cross members are large, and entry amounts of the side sills are a little large with respect to the structure 1. On the other hand, in the structure 2 in which the first top portions 36 of the corrugated plate portion are positioned in regions, in the side sill, to which the cross members are connected, a deformation of the side sill is restrained, resulting in a large decrease in the entry amount of the side sill with respect to the other structures. According to a result of this simulation, when the corrugated plate portion is not provided between the cross members, it is found preferable that the first top portion 36 of the corrugated plate portion is not positioned between the cross members.

<Simulation (3)>

A pole side impact simulation was carried out by using models in which angles θ made by a first diagonal portion and a second diagonal portion (FIG. 5) were varied. The model having an angle θ of 30 degrees, the model having an angle θ of 60 degrees, and the model having an angle θ of 90 degrees are used in this simulation. Note that the model having the angle θ of 60 degrees is the same model as the structure 1. The models having the angles θ of 30 degrees and 60 degrees are the same model as the structure 1 except that the angles are different.

Figure 13:
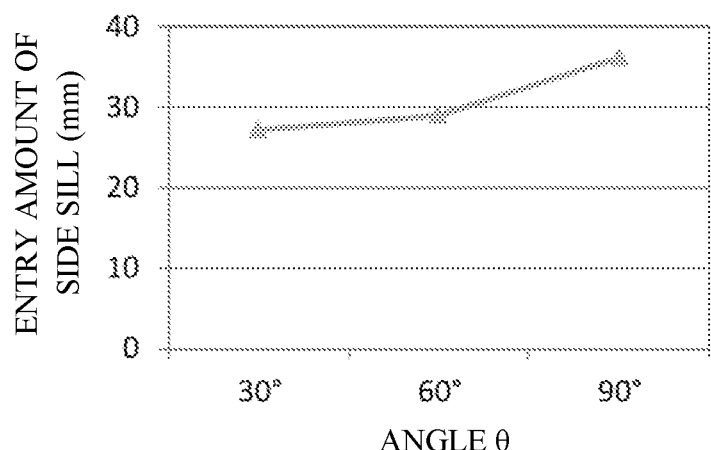
FIG. 13 is a chart illustrating results of a pole side impact simulation (3).
Figure 13:
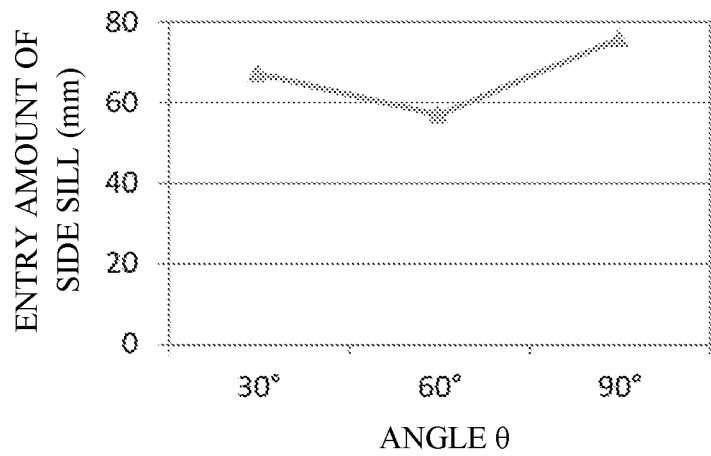

FIG. 13 is a chart illustrating results of this simulation. As illustrated in FIG. 13(a), in the models in each of which a corrugated plate portion is provided in a connection position of a side sill and a cross member, the smaller the angle θ was, the more an entry amount of the side sill was restrained. According to a result of this simulation, the angle θ when the corrugated plate portion is provided in the connection position of the side sill and the cross member is preferably 70 degrees or less. The angle θ is more preferably 60 degrees or less. Further, as illustrated in FIG. 13(b), in the models in each of which the corrugated plate portion is provided between the cross members, the closer the angle θ was to 60 degrees, the more the entry amount of the side sill was restrained. According to a result of this simulation, the angle θ when the corrugated plate portion is provided between the cross members is preferably 40 to 80 degrees. The angle θ is more preferably 50 degrees or more, and further, more preferably 70 degrees or less.

INDUSTRIAL APPLICABILITY

The present invention can be applied to an automobile underbody structure.

EXPLANATION OF CODES 1 underbody structure
10 first frame part
20 second frame part
20a first wall portion
20b second wall portion
21 hollow portion
22 inner member
22a top plate
22b vertical wall
22c flange
23 outer member
23a top plate
23b vertical wall
23c flange
30 impact absorbing member
31 first beam portion
32 second beam portion
33 corrugated plate portion
34 first diagonal portion
35 second diagonal portion
36 first top portion
37 second top portion
D distance between two adjacent corrugated plate portions
R region, in second frame part, to which first frame is connected
θ angle made by first diagonal portion and second diagonal portion

The invention claimed is:

1. An automobile underbody structure comprising:
a plurality of spaced first frame parts;
a second frame part having a hollow portion extending so that an axial direction of the first frame part is a normal direction when seen from a vehicle height direction; and
an impact absorbing member disposed in the hollow portion of the second frame part, wherein:
the second frame part has a first wall portion and a second wall portion facing the first wall portion;
the first wall portion is connected to vehicle-exterior end faces of the first frame parts in the axial direction;
the impact absorbing member includes:
a first beam portion extending along an axial direction of the second frame part;
a second beam portion facing the first beam portion; and
a corrugated plate portion connected to the first beam portion and the second beam portion between the first beam portion and the second beam portion, wherein:
the first beam portion is connected to the first wall portion of the second frame part;

the second beam portion is connected to the second wall portion of the second frame part;

the corrugated plate portion includes:

a first diagonal portion extending in a direction from the second beam portion toward the first beam portion;

a second diagonal portion extending in a direction from the first beam portion toward the second beam portion;

a first top portion which is a connection portion of the first diagonal portion and the second diagonal portion on the first beam portion side; and a second top portion which is a connection portion of the first diagonal portion and the second diagonal portion on the second beam portion side; and the corrugated plate portion is provided in at least respective regions, in the second frame part, to which the two adjacent first frame parts are connected, wherein the impact absorbing member includes a plurality of the corrugated plate portions, and wherein:

the respective corrugated plate portions are spaced along an extending direction of the impact absorbing member; and the first top portion of the corrugated plate portion is not positioned in a region between the two adjacent first frame parts.

2. The automobile underbody structure according to claim 1, wherein the first top portions and the second top portions are at five points or more in total.

3. The automobile underbody structure according to claim 1, wherein the second frame part is a side sill.

4. The automobile underbody structure according to claim 1, wherein the second frame part is a bumper beam.

\* \* \* \* \*